July 26, 1966  K. BREUER  3,262,331
OFFSET GEARING
Filed March 15, 1965  4 Sheets-Sheet 1
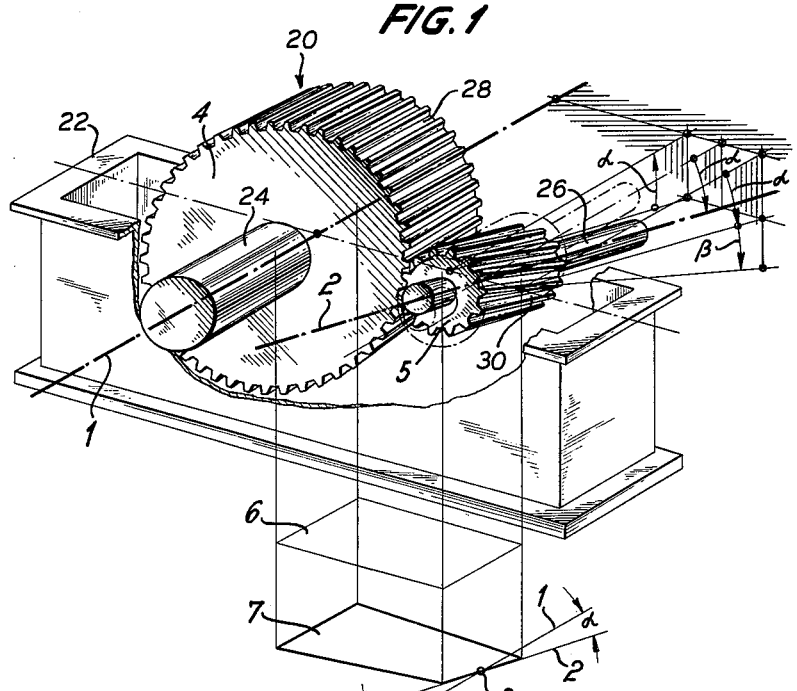
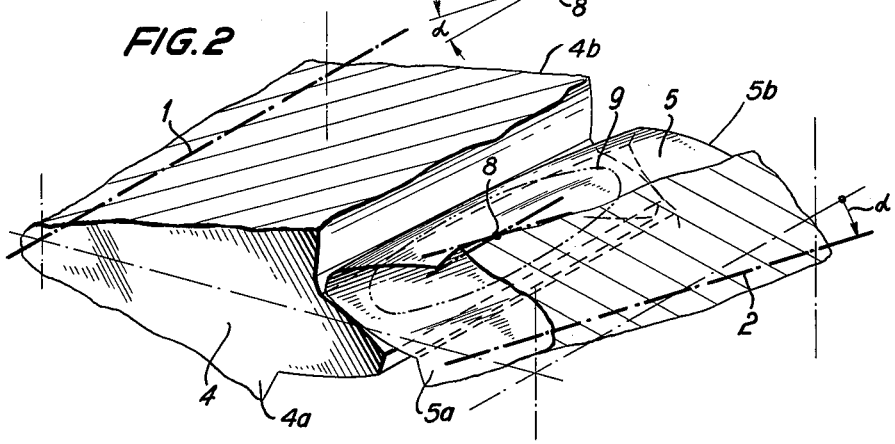
INVENTOR
KARL BREUER
BY
ATTORNEYS.

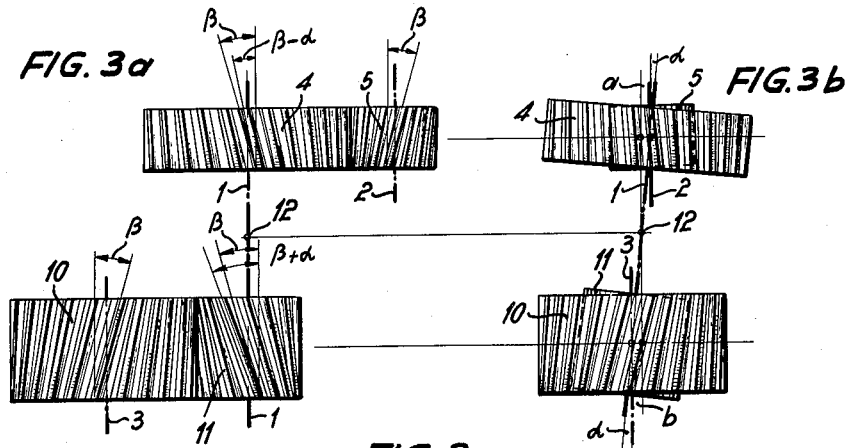
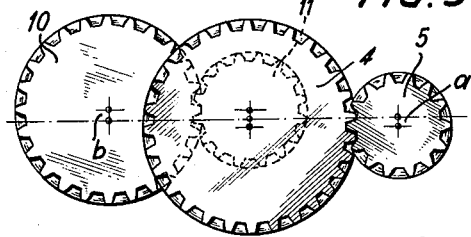
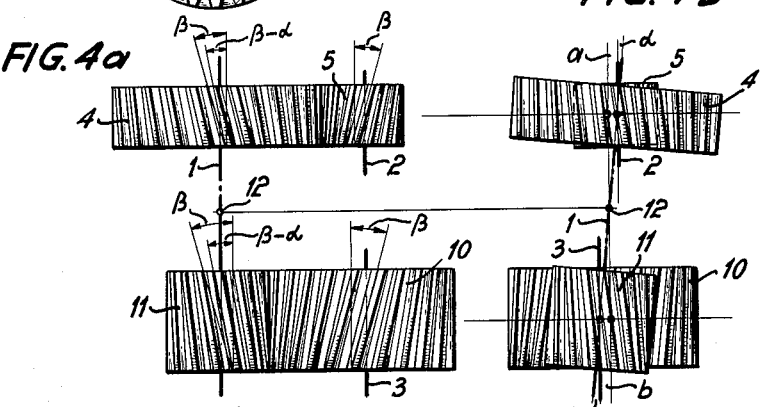
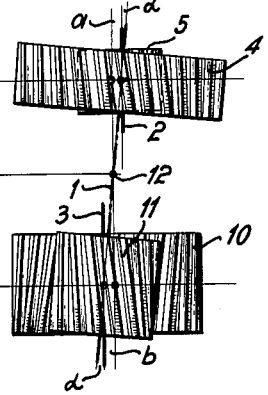
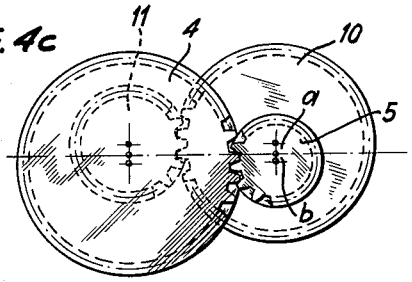

July 26, 1966  K. BREUER  3,262,331
OFFSET GEARING
Filed March 15, 1965  4 Sheets-Sheet 3

INVENTOR
KARL BREUER
BY
McGlew and Toren
ATTORNEYS.

July 26, 1966  K. BREUER  3,262,331
OFFSET GEARING
Filed March 15, 1965  4 Sheets-Sheet 4

INVENTOR
KARL BREUER
BY
M. Glew and Toren
ATTORNEYS.

United States Patent Office

3,262,331
Patented July 26, 1966

3,262,331
OFFSET GEARING
Karl Breuer, Duisburg, Germany, assignor to Demag Aktiengesellschaft, Duisburg, Germany
Filed Mar. 15, 1965, Ser. No. 444,500
Claims priority, application Germany, Apr. 13, 1961,
D 35,841
20 Claims. (Cl. 74—412)

This invention relates in general to the construction of mating gears, and in particular to a new and useful construction and arrangement of mating gears without spiral tooth formation or machining in which the tooth bearing contact is maintained intermediate the gear teeth width under load without undue stressing of the ends of the teeth. This application is a continuation-in-part of application Serial No. 184,871 filed on April 3, 1962, now abandoned.

In the inventive construction and arrangement, the axes of the gears are offset from their normal arrangement and in addition to the gear teeth of each gear, or of one gear alone, is offset in an amount corresponding to the angle of offset of the gear axes in order to produce an improved rolling bearing contact between the widths of the gear teeth rather than high stress contact at the ends.

The present invention is particularly concerned with improvements in gears of all types and may be employed, for example, with mating spur gears having straight, oblique, arrow-like or arc-shaped toothed wheels. The invention is also applicable, for example, to bevel gears wherein the teeth of the bevel wheels are made either straight, oblique or arc-shaped. In addition, the invention is applicable to worm gears having worms and worm wheels, and also to gearings where a spur wheel pinion meshes with a panetary wheel or wherein a spur wheel pinion meshes with a rack, for example.

Prior to the present invention, there have been attempts to form gearings which will have desirable rolling contact by forming one of the gear wheels with gear teeth which are machined precisely in a special manner so that this specially machined gear can be mated with a gear which is arranged with its axis offset in respect to the machined gear. A disadvantage in such an arrangement is that it is still necessary to machine one gear in a special manner, and this is expensive and time consuming. In accordance with the present invention it has been found that the effect of central rolling contact without end tooth stress may be obtained in respect to mating gears by offsetting the axes of these gears in respect to each other so that they will be, nonparallel in respect to spur gears and helical gears, and nonperpendicular in respect to bevel gears. In addition, the teeth of at least one of said gears is formed at an angle or a pitch in respect to its axis of rotation which is equivalent to the angle of offset of the shaft of the gearing in respect to each other. Thus, for example, it is possible to machine an ordinary spur gear for one gear of the combination in the usual manner making straight cuts across the gear to form the usual teeth of uniform configuration from side to side. Then the other gear is formed with teeth of usual formation but offset in the manner of helical gearing by an angle equivalent to the angle at which the axes of the gears are offset from parallel.

As is known, tooth damage of gearing frequently occurs at tooth ends due to pitting, wear end tear, etc. In some instances the teeth may break off at the ends, and this occurs particularly in large size gears and gears which move at high speeds, for example in spur wheel gearings. The breaking of the teeth at the ends occurs very often in respect to spur wheels. Many different reasons can be enumerated for such tooth damage, but the causes cannot always be eliminated. Some of the causes, for example, are as follows:

(1) Wobbling or oblique positioning of the gear shafts of the gear wheels and their bearings. Friction bearings generally permit more wobbling than roller bearings, due to the larger play. Such wobbling is caused by non-eccentric torques in the individual shafts.

(2) Wobbling or oblique or inclined positioning of the gearing caused by small but permissible finishing or working errors. This occurs particularly in hardened or tempered non-ground gearing and may also be caused by release of tension in the material due to the age of the material.

(3) Rotation of the gear shafts or the gear wheels when the torque is applied to the tooth rim in a non-symmetrical manner or in a one-sided manner.

(4) Bending of the gear shafts or gear wheels.

(5) In planetary gears all of the above errors occur and if several planetary gears are operating, each planet will have a different error tendency, so that the errors may be cumulative.

Wobbling or oblique positioning of the gear shaft causes the meshing engagement to be displaced toward the tooth ends which in turn causes the tooth damage which has been referred to. In some instances, attempts have been made to overcome this by forming the tooth ends with a lateral inclination or by reversing the flanks at the tooth ends. Thus, for example, bulging flanks (i.e., forming the teeth with bulges between each end) have been proposed in order to diminish the load on the flanks at the tooth ends and to overcome the disadvantages caused by wobbling. Such bulging is usually only produced at the tooth ends in the manufacture of the teeth, and thus the manufacturing process requires an after-working which is manually performed. If the bulging is produced on a machine, then the manual after-working makes the gears much more expensive and very accurate means are provided for producing the flank portions after the tooth outline has been cut out. Since the bulging arrangement must be varied for each of the types of gears employed, additional manufacturing equipment must be provided for each of these types. Additional efforts have been made to overcome the disadvantages referred to above by providing bearing blocks which are held in a yielding manner so that the shafts of the gear move in order to accommodate unbalancing forces and stresses. Even in this arrangement, however, the pressing at the edges and the meshing engagement at the edges cannot be entirely prevented.

According to the present invention, there is provided, for example in the case of spur gears and the like, means for rotatably mounting the gears with their axes deviating slightly from parallel, and this deviation from parallel is duplicated by a corresponding change in the combined pitch angle of each of the gears. For example, for an ordinary straight spur gearing having two spur gears with parallel axes, there is provided in accordance with the invention a very small oblique setting of the axes in order to obtain a very small extent the effect of a screw or helical gearing. This oblique setting where the axes of the individual gears will theoretically intersect a great distance away can be provided at one or both shafts and a corresponding inclined setting of the teeth at one or both of the gear wheels is provided (i.e., the teeth are formed at a lateral offset angle or pitch and the sum of the offset angles is made substantially equal to the oblique setting of the shaft axes). This principle is applicable regardless of whether the teeth are oblique, arrow-like or arc-shaped, or whether the gears are spur, bevel or worm gearings.

In the event that with the gear construction in accordance with the invention the shaft should become misaligned or there is a wobbling of the gear wheels or gear shafts, then the contact surface at the tooth flanks of these gears does not migrate in a direction toward the ends of the teeth. In extreme cases there may be a slight migration toward the tooth end, but to a much lesser degree than in prior art constructions. The contact surface between the meshing teeth will usually, during load conditions, remain symmetrical along the tooth width and the high edge pressing which is unsatisfactory at the tooth ends is prevented. If the torque is supplied on one side only of thin spur wheels or bevel gear pinions, then the apex of the bulginess will be displaced intentionally to the opposite side, that is to where the torque is supplied. If the torque is supplied on one side only on a thin pinion having arrow-shaped or herringbone teeth, then the apex point of the bulginess will be placed into the center of the total width of the arrow gearing. In these last two mentioned cases, the contact surface, during operation, will appear over the entire tooth surface in order to consider the practical condition. In the case of herringbone gearing, the oblique angle is increased to a small extent in one half portion, while in the other half the oblique angle will be decreased to a small extent. Thus, the invention permits the obtaining of the equivalent of bulginess of the gearing without manual after-working and without requiring any additional devices for finishing the gear.

In the case of gears which have rough teeth or which have hardened or unground teeth, it is preferable, in accordance with the invention, to eliminate contact up to the teeth ends and a widening of the contact takes place at the starting area instead. Thus, even in second class gearings, tooth flanks which up to now were exactly worked or formed, can be worked or formed with less exactness and without the operation of the gears being impaired.

In those instances where arc-shaped teeth or bevel gears are involved, pinions or gear wheels are usually produced with cutting knives. The cleaning or finishing of the ends is usually obtained by an additional movement of the gear teeth producing machine. According to this invention, however, such additional movement during the manufacture is no longer necessary.

Similar advantages are obtained in connection with worm gears. In prior art methods, the varying clearances of the worm gear teeth ends is usually obtained by a plurality of worm milling cutters but according to the invention the worm milling cutter can have the same diameter as the worm proper and the varying clearance between the worm wheel ends is produced by the inventive arrangement.

In order to accomplish the intersecting or oblique positioning of the axes of the meshing gears, it is preferred in accordance with the invention to arrange the mounting of the shafts of the gears in holding or adjusting rings having oblique and/or eccentric bores. In order to prevent any edge formation of the shaft within the bearing, particularly if friction bearings are used, the eccentric bearing holes or the eccentric holes in the adjusting rings which hold the roller bearings can extend to a small extent in a diagonal direction relative to the axial direction, so that the bearings will bear uniformly over their surfaces and will be uniformly loaded with no edging of the shaft in the bearing tending to take place.

The end surfaces of the bearings and/or of the adjusting rings or bushings which have oblique eccentric bores are provided with bores or pins which extend in an axial direction. These bores or pins make possible a correction in the bearing position by means of tools which are inserted into the bores or which are applied to the pin. Such corrections are effected after the holding means or adjusting rings have been assembled and fixing bolts are provided to secure the bearings in the adjusted position.

Accordingly, it is an object of the invention to provide an improved gearing construction in which the tooth contact bearing pattern under loading conditions remains intermediate the width of the gear teeth without subjecting the teeth to high edge pressures.

A further object of the invention is to provide improved gearing having mating teeth arranged at a selected pitch angle and including bearing means for disposing the axes of the various gears in a manner deviating from parallel in respect to spur gearing and the like, and from perpendicular in respect to worm gearing and the like, by an amount substantially equal to the sum of the pitch angles of the mating gearings.

A further object of the invention is to provide improved bearing means for mounting gears in a manner in which the undue stressing of the gears at the sides is avoided.

A further object of the invention is to provide gearing which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a perspective view of mating spur gears constructed and arranged in accordance with the invention;

FIG. 2 indicates in a large perspective view a portion of the gearing indicated in FIG. 1, showing the bulginess of the gearing and the contact surface development thereof;

FIG. 3a is a somewhat schematic top plan of compositive gearing constructed and arranged in accordance with the invention;

FIG. 3b is a right hand elevation of the gearing indicated in FIG. 3a;

FIG. 3c is an end elevation of the gearing indicated in FIG. 3a;

FIG. 4a is a top plan of still another embodiment of composite gearing;

FIG. 4b is a right hand elevation of a gearing indicated in FIG. 4a;

FIG. 4c is an end elevation of the gearing indicated in FIG. 4a;

FIG. 5b is a right hand elevation of the gearing indicated in FIG. 5a;

FIG. 5c is a side elevation of the gearing indicated in FIG. 5a;

FIG. 6b is a view of the mating planetary and sun gears indicated along the lines 6b—6b of FIG. 6a;

Figure 7:
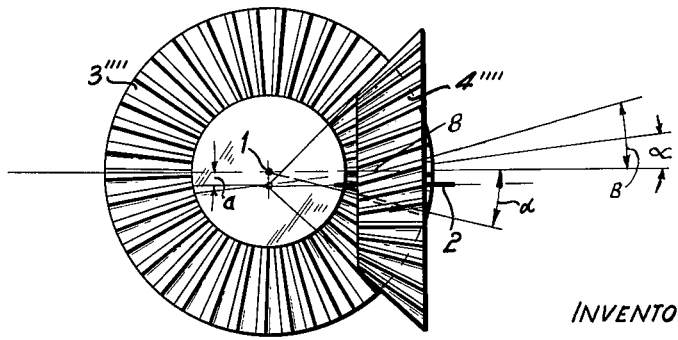
Figure 8:
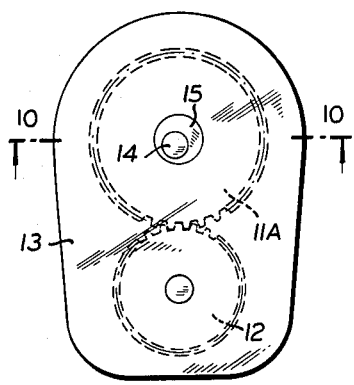
Figure 11:
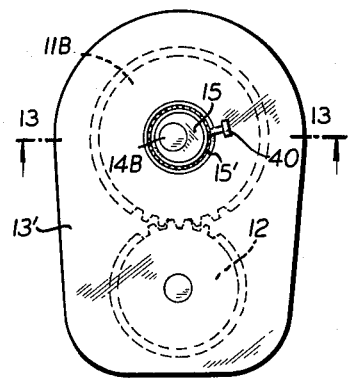
Figure 9:
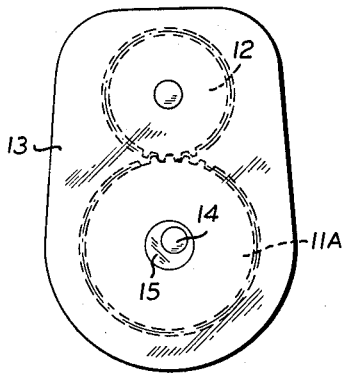
Figure 12:
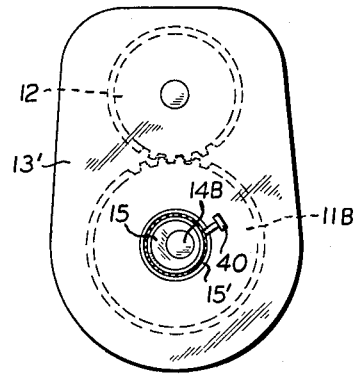
Figure 10:
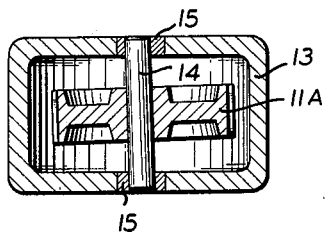
Figure 13:
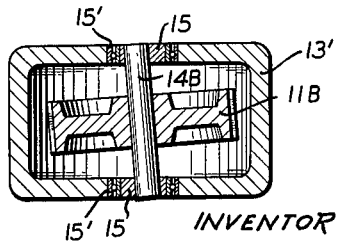

FIG. 7 indicates mating bevel gears with a bevel wheel having straight teeth and a corrected pinion having teeth corresponding to the axial displacement;

FIG. 8 is a front elevation of a housing with eccentric mountings for a gearing arranged in accordance with the invention;

FIG. 9 is a rear elevation of the housing indicated in FIG. 8;

FIG. 10 is a section taken on the line 10—10 of FIG. 8;

FIGS. 11, 12 are front and rear elevations of another embodiment of gear casings; and FIG. 13 is a section taken on the line 13—13 of FIG. 11.

Referring to the drawings in particular, the invention embodied therein in FIG. 1 includes gearings or interengaged toothed wheels generally designated 20 constructed and arranged in accordance with the invention in a gear casing 22 to obtain a tooth contact bearing pattern under load which remains intermediate the width of the teeth so that the teeth are not subjected to high edge pressures. The gearing construction includes means formed in the housing 22 for rotatably supporting a gear axle 24 of a large spur wheel 4 with its axis 1 aligned in the usual manner, e.g., horizontal. The housing 22 also provides bearing means for rotatably supporting a shaft 26 of a pinion 5 with the axis 2 thereof arranged to make a very slight angle α with the axis 1 of the shaft 24.

In accordance with the invention it was discovered that gears 4 and 5 could be arranged to interengage or intermesh by an arrangement which would insure that the tooth contact bearing pattern under loading conditions or the transmission of torque through one of the shafts 24 or 26 could be maintained between the width of the teeth 28 and 30 for gears 4 and 5, respectively, in a desirable rolling bearing contact pattern, if the axes of these gears were arranged askew or out of parallel to a slight extent and if the gear teeth of one or both of the gears are correspondingly disposed at an angle laterally or arranged at an angle in respect to its own axis. Thus, in accordance with the invention, the axes of the shafts 26 and 24 which are indicated as 1 and 2, respectively, and which would normally be situated in a plane 6, are changed for orientation in a plane 7 having an obliquely arranged side in which the axis 2 devitates from the axis 1 by an angle indicated as α.

A feature of the invention is that both gears 4 and 5 may be made with the usual gear making machines without any special operation, and the desirable tooth bearing pattern indicated in dotted lines at 9 of FIG. 2 between two engaged teeth 28 and 30 of the gears 4 and 5 can be obtained. The bearing pattern 9 may be maintained centered between the sides 4a and 4b of the tooth 4 and 5a and 5b of the tooth 5, provided the axes are offset in the manner indicated and one of the gears 4 and 5 have their teeth offset in a corresponding amount or both of the gears 4 and 5 have their teeth offset in a proportional amount of the sum of which is equal to the angle of offset of their axes.

It should be appreciated that if the gears are not constructed in accordance with the arrangement of the invention, the bearing pattern which has been indicated at 9 in FIG. 2 for the inventive arrangement would be generally rectangular and would be located near one or the other edge 4a and 4b depending upon the driving torque direction. The prior art construction of arranging the axes parallel thus results in an unfavorable bearing pattern in which the ends of the teeth are subjected to extremely high stresses. The invention permits correction of the bearing pattern without requiring the production of a crowned tooth flank or a special configuration of the teeth 28 or 30.

The invention requires that the angle of offset of the axis 2 from the axis 1 designated α be correspondingly compensated for in the offsetting of the teeth 28 or 30 of the gears 4 and 5. In the embodiment illustrated, the teeth 30 are arranged at an angle β from its axis 2 which angle is made substantially equal to the angle α. The same result could be obtained by machining the gear wheel 4 with teeth 28 which extend at an angle or pitch from the axis 1 by an angle β equal to the angle α, or, each gear wheel 4 and 5 could be made with teeth 28 and 30 with a pitch angle the sum of which is equal to the angle α. The end to end curvature of the teeth 30 in respect to its axis 2 is a measure of the bulginess or rolling contact pattern of the teeth and a "hertz" pressing. The central position of maximum projection is designated 8 and the projection decreases in magnitude from the point 8 toward the left and toward the right.

Of course, in accordance with the invention, the oblique angle α may be effected by shifting the axis 1 rather than the axis 2. It is also possible to make the teeth 28 with the inclination corresponding to the angle β or the teeth 28 and 30 could be made with inclinations of an amount the sum of which corresponds with the angle α.

In FIG. 2 there is indicated the result of the construction in accordance with the invention in a schematic manner. As can be seen, the contact surface developed at 9 does not reach to the tooth ends. The greatest "hertz" pressing occurs at the point 8.

In FIGS. 3a, 3b and 3c there is indicated diagrammatically the construction of a two-stage gearing. In this embodiment, in addition to meshing gears 4 and 5, there is provided a gear 10 and a pinion 11 for a second stage. The pinion 11 is secured to the shaft 1 for rotation therewith. As indicated particularly in FIG. 3c, the pinion 5 is centered a small amount below the horizontal plane in an amount corresponding to the obliqueness of the axes 1 and 2, while the wheel 10 is centered above the horizontal by the same amount indicated b. In this manner the driving and the driven axes 2 and 3 are arranged exactly parallel, but they are not on the same level. The intermediate shaft 1 is inclined in respect to the axis 2 by an angle α about the rotational point or pivot 12.

The gear teeth defined on the gears in the train are inclined in respect to the gear axes by an angle β in the same manner as indicated in FIG. 1. The axial obliqueness of the shaft 1 about the angle α is subtracted from the oblique angle β and is added in the gearing of the pinion 11 to the oblique angle β.

The gearing in FIGS. 4a, 4b, and 4c have coaxial input and output shafts in a manner similar to that indicated in FIGS. 3a, 3b and 3c. The shaft 1 is imparted with an axial obliqueness α while the shafts 2 and 3 remain exactly parallel and are offset in a vertical plane by amounts indicated a and b. In this embodiment in the first stage the axial obliqueness of the angle α is considered and this obliqueness is subtracted from the oblique angle α in the second stage. The apex of the bulginess in FIGS. 3 and 4 is now situated in the center of the respective gearing width.

Figure 5A:
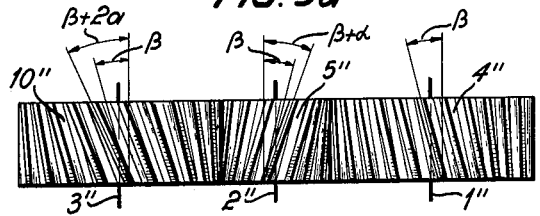
FIG. 5a is a top plan of still another embodiment of composite gearing with obliquely arranged teeth on spur gears.
Figure 5B:
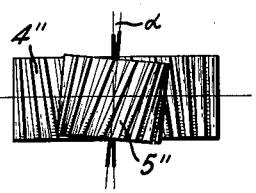
Figure 5C:
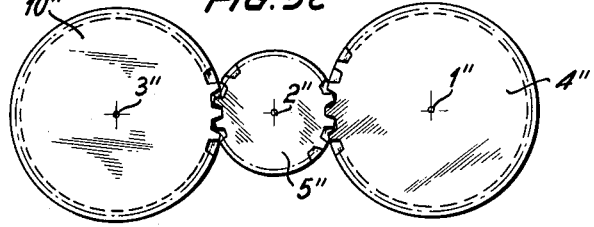

In FIGS. 5a, 5b and 5c the axes 1″ and 3″ are arranged in a common horizontal plane and the intermediate axis 2″ is imparted with an obliqueness equal to the angle α. If it is assumed that the obliqueness β of the gear teeth of the wheel 4″ is not corrected, then the obliqueness of the wheel 5″ is equal to $\beta + \alpha$ and the obliqueness of the wheel 10″ is equal to $\beta + 2\alpha$. If the angle β at the wheel 5″ is not corrected, then the obliqueness of the wheel 4″ will be equal to $\beta - \alpha$ while the obliqueness of the wheel 10 will be equal to $\beta + \alpha$.

Figure 6B:
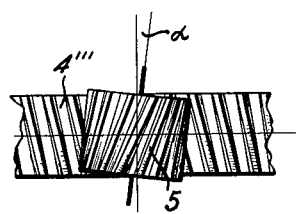
Figure 6A:
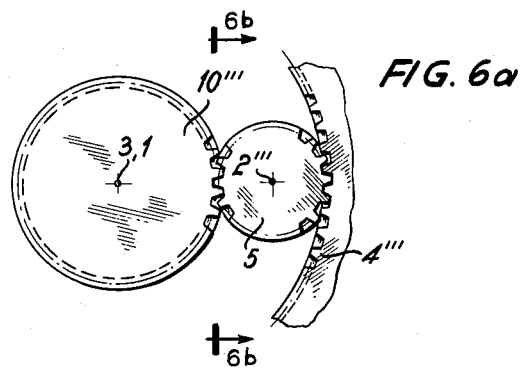
FIG. 6a is a top plan of a planetary gearing arrangement constructed in accordance with the invention.

In FIGURE 6 a multiple gear chain is indicated which includes a sun gear 4‴ and a planetary gear 2‴. This multiple gear arrangement is arranged in a manner similar to that indicated in FIGS. 5a, 5b and 5c.

The bevel gearing with straight teeth, as indicated in FIG. 7, includes a wheel 3″″ having straight teeth. The axial offset about the amount a corresponds to the correction angle α and it is considered in the bevel pinion 4″″ with the obliqueness $\beta = \alpha$.

In FIGS. 8, 9 and 10 there is indicated housing or gear casing 13 which includes bearing end walls having bearing sleeves or collars 15 with an eccentric bore 14 to receive the shaft of a large gear 11a. In this embodiment, a pinion 12 is mounted in the usual manner for meshing engagement with the gear 11a.

In FIGS. 11–13 there is indicated a pair of gears mounted on a casing 13′, a large gear 11b having a shaft 14b which is mounted in glide bushings 15 and 15′. The bushings are rotatably mounted in the casing walls and include bores, the center lines of which are angularly offset, but which are in alignment.

The bearing bushings 15 and 15′ provide an angularly offset mounting for the gear 11b. Means such as set screws 40 are provided to anchor the bushings 15 and 15′ in their adjusted positions.

Thus, gears which are produced in accordance with this invention do not require any additional expenditure in regard to production, but only a single constructional step. The extent of the bulginess of the tooth flanks of each gear pair will be chosen according to:

(1) The purpose to which the gears are put;
(2) The finishing exactness which is required; and
(3) In dependence on the magnitude of the oil wedge for gear pairs having large gliding speeds along the flanks.

The invention is a vast improvement over the prior art by reducing the cost for the manufacture of such gearings and provides a gear construction which is of much more durable quality than known heretofore.

While specific embodiments of the invention have been shown and described in detail to illustrate the application of the inventive principles, it will be understood that the invention may be embodied otherwise without departing from such principles.

What is claimed is:

1. A gearing comprising a first gear having first teeth, a second gear having second teeth in meshing engagement with said first teeth of said first gear, means mounting said first and second gears with their axes offset from a regular position, said first and second teeth being of ordinary configuration with at least one of said first and second teeth being formed at an angle (pitch) from its axis of a magnitude substantially equal to the magnitude of the offsetting of the axes of said gears to provide a tooth bearing pattern which under load remains intermediate the widths of said first and second gear teeth without causing undue end stressing of said teeth.

2. A gearing comprising a first gear having first teeth, a second gear having second teeth in meshing engagement with said first teeth of said first gear, means mounting said first and second gears with their axes offset from a regular position, said first and second teeth being of ordinary configuration with at least one of said first and second teeth being formed at an angle (pitch) from its axis of a magnitude substantially equal to the magnitude of the offsetting of the axes of said gears to provide a tooth bearing pattern which under load remains intermediate the widths of said first and second gear teeth without causing undue end stressing of said teeth, said first and second gears being spur gears.

3. A gearing comprising a first gear having first teeth, a second gear having second teeth in meshing engagement with said first teeth of said first gear, means mounting said first and second gears with their axes offset from a regular position, said first and second teeth being of ordinary configuration with at least one of said first and second teeth being formed at an angle (pitch) from its axis of a magnitude substantially equal to the magnitude of the offsetting of the axes of said gears to provide a tooth bearing pattern which under load remains intermediate the widths of said first and second gear teeth without causing undue end stressing of said teeth, said first and second gears being gears having helical teeth, at least one of said gears having the pitch angle of said helical teeth formed at a pitch angle deviating from the normal helical pitch angle by the additional amount of offset of the axes of said gears.

4. A gearing comprising a first gear having first teeth, a second gear having second teeth in meshing engagement with said first teeth of said first gear, means mounting said first and second gears with their axes offset from a regular position, said first and second teeth being of ordinary configuration with at least one of said first and second teeth being formed at an angle (pitch) from its axis of a magnitude substantially equal to the magnitude of the offsetting of the axes of said gears to provide a tooth bearing pattern which under load remains intermediate the widths of said first and second gear teeth without causing undue end stressing of said teeth, said first and second gears being bevel gears, the axes of said gears being offset from a perpendicular relationship to each other.

5. A gearing comprising a first gear having first teeth, a second gear having second teeth in meshing engagement with said first teeth of said first gear, means mounting said first and second gears with their axes offset from regular position, said first and second teeth being of ordinary configuration with at least one of said first and second teeth being formed at an angle (pitch) from its axis of a magnitude substantially equal to the magnitude of the offsetting of the axes of said gears to provide a tooth bearing pattern which under load remains intermediate the widths of said first and second gear teeth without causing undue end stressing of said teeth, a third gear having third gear teeth mounted on the axis of said first gear for rotation therewith, the axis carrying said third gear and said first gear being offset, and a fourth gear having fourth gear teeth in meshing engagement with said third gear teeth, said fourth gear teeth being formed at an angle from its axis beyond that required for engagement with said third gear teeth by an amount equivalent to the angle of offset of said axis, the axis of said fourth gear being substantially parallel to the axis of said second gear.

6. A gearing comprising a first gear having first teeth, a second gear having second teeth in meshing engagement with said first teeth of said first gear, means mounting said first and second gears with their axes offset from regular position, said first and second teeth being of ordinary configuration with at least one of said first and second teeth being formed at an angle from its axis of a magnitude substantially equal to the magnitude of the offsetting of the axes of said gears to provide a tooth bearing pattern which under load remains intermediate the widths of said first and second gear teeth without causing undue end stressing of said teeth, a third gear having third gear teeth mounted on the axis of said first gear for rotation therewith, said first gear axis carrying said third gear being offset, and a fourth gear having fourth gear teeth in meshing engagement with said third gear teeth, said fourth gear teeth being formed at an angle from its axis by an amount equivalent to the angle of offset of said axis, the axis of said fourth gear being substantially parallel to the axis of said second gear and spaced vertically therefrom.

7. A gearing comprising a first gear having first teeth, a second gear having second teeth in meshing engagement with the first teeth of said first gear, means mounting said first and second gears with their axes deviating from a substantially parallel relationship, said first and second gear teeth being of ordinary configuration with at least one of said first and second gear teeth being formed at an angle from its axis by an amount substantially equal to the angle of offset of the axes of said gears from parallelism to provide a tooth bearing pattern which under load remains intermediate the widths of said first and second gear teeth without causing undue end stressing of said teeth.

8. A gearing comprising a first gear having first teeth, a second gear having second teeth in meshing engagement with the first teeth of said first gear, means mounting said first and second gears with their axes deviating from a substantially parallel relationship, said first and second gear teeth being of ordinary configuration with at least one of said first and second gear teeth being formed at an angle from its axis by an amount substantially equal to the angle of offset of the axes of said gears from parallelism to provide a tooth bearing pattern which under load remains intermediate the widths of said first and second gear teeth without causing undue end stressing of said teeth, said first gear being a planetary gear having an inclined axis.

9. A gearing comprising a first gear having first teeth, a second gear having second teeth in meshing engagement with the first teeth of said first gear, means mounting said first and second gears with their axes deviating from a substantially parallel relationship, said first and second teeth being of ordinary configuration with at least one of said first and second teeth being formed at an angle from its axis of a magnitude substantially equal to the magnitude of the offseting of the axes of said gears from parallelism to provide a tooth bearing pattern which under load remains intermediate the widths of said first and second gear teeth without causing undue end stressing of said teeth, said mounting means including a housing, a bearing collar rotatably mounted in said housing adjacent each end of the axes of said first and second gears, each of said bearing collars having an eccentric bore, said bearing collar being shiftable to shift the position of the centerline of the bore thereof, at least one of said gears having a shaft which extends into and is rotatably supported in corresponding bores of said collars at each end at an angle from the axis of the other of said gears.

10. Mounting means for gearing comprising a housing having spaced side walls, a collar rotatably mounted in each of said side walls with respective collars in each wall being aligned laterally, said collars each having an eccentric bore defined therein, said collar being rotatable for shifting the location of said bore, the bore of said collars defining a rotatable journal for a shaft which may be mounted to deviate from horizontal in accordance with the rotation of said collar and the rotation of said bore.

11. Mounting means for gearing comprising a housing having spaced side walls, a collar rotatably mounted in each of said side walls with respective collars in each wall being aligned laterally, said collars each having an eccentric bore defined therein, said collar being rotatable for shifting the location of said bore, the bore of said collars defining a rotatable journal for a shaft which may be mounted to deviate from horizontal in accordance with the rotation of said collar and the rotation of said bore, and means for anchoring said collar in an adjusted position.

12. In a gear drive including at least one first straight toothed spur gear in meshing engagement with a second substantially straight toothed spur gear which is formed with teeth extending at a slight pitch angle, the improvement comprising mounting said gears so that their axes deviate from parallel by an amount equivalent to the pitch angle of said second gear whereby to obtain an effect of helical gearing at least in a small degree.

13. A gearing comprising a first gear having first teeth, a second gear having second teeth in meshing engagement with the first teeth of said first gear, means mounting said first and second gears with their axes deviating from a substantially parallel relationship, said first and second teeth being of ordinary configuration with at least one of said first and second teeth being formed at an angle from its axis equal to the angle of offset of the axes of said gears from parallelism to provide a tooth bearing pattern which under load remains intermediate the widths of said first and second gear teeth without causing undue end stressing of said teeth, said first and second gear axes being set at an angle of about 0.5° and not in excess of 5°.

14. A gear drive with unilateral torque introduction into a plurality of spur gears, means for mounting said gears with their axes diverging from parallel by a certain angle, said gears having teeth of ordinary formation without being curved from side to side and bulging centrally and without having a crown formation but with the teeth of at least one of said gears being formed at an angle from its axis of a magnitude substantially equal to the angle of deviation from said gear axes from parallel.

15. A gear drive with unilateral torque introduction into a plurality of spur gears, means for mounting said gears with their axes diverging from parallel by a certain angle, said gears having teeth of ordinary formation and without being curved from side to side and without having a crown formation but with the teeth of at least one of said gears being formed at an angle from its axis of a magnitude substantially equal to the angle of deviation from said gear axes from parallel, the axes and the teeth formations of said gears being such that the apex of the rolling bearing contact of the gear teeth is shifted from approximately the center of said teeth toward the side which lies away from the torque introduction side.

16. A gearing arrangement including at least two interengaging gear wheels having gear teeth with spherically running tooth flanks of ordinary formation without having a curved surface formed between the sides thereof characterized in means mounting the axles of said gear wheels in a manner such that said axles intersect at a small angle, the tooth slopes on at least one of said wheels being selected such that the slopes are equal to the angle of divergence of the axes of said wheels and result at least to a minimum extent in the effect of spiral gearing.

17. A gearing including at least two gears with interengageable gear teeth, means for rotatably mounting said gears with their axes being substantially parallel but deviating slightly from the base line in the case of spur gears and planetary gears, the teeth being corrected (formed) at an angle $\beta$ and the correction angle of at least one gear being in dependence on the deviation angle $\alpha$ to provide a tooth bearing pattern of elliptical form which under load remains intermediate the widths of said interengageable gear teeth without causing stressing the corners of said teeth.

18. A gearing including at least two gears with interengageable gear teeth, means for rotatably mounting said gears with their axes being substantially parallel but deviating slightly from the base line in the case of spur gears and planetary gears, the teeth being corrected by forming them at a correction angle $\beta$ in respect to each respective gear axis, the correction angle of at least one gear being equal to the deviation angle $\alpha$ to provide a tooth bearing pattern of elliptical form which under load remains intermediate the widths of said interengageable gear teeth without causing stressing the corners of said teeth.

19. A gearing including at least two bevel gears, worm gears and the like with interengageable gear teeth, means for rotatably mounting said gears with their axes deviating slightly from a perpendicular relationship to each other, the teeth being corrected (formed) at an angle $\beta$ and the correction angle of at least one gear being in dependence on the deviation angle $\alpha$ to provide a tooth bearing pattern of elliptical form which under load remains intermediate the widths of said interengageable gear teeth without causing stressing the corners of said teeth.

20. A gearing including at least two gears with interengageable gear teeth, means for rotatably mounting said gears with their axes being substantially perpendicular but deviating slightly from the base line in the case of bevel gears and worm gears, the teeth being corrected by forming them at a correction angle $\beta$ in respect to each respective gear axis, the correction angle of at least one gear being equal to the deviation angle $\alpha$ to provide a tooth bearing pattern of elliptical form which under load remains intermediate the widths of said interengageable gear teeth without causing stressing the corners of said teeth.

References Cited by the Examiner
UNITED STATES PATENTS

| 1,816,273 | 7/1931 | Wildhaber | 74—462 |
| 2,002,310 | 5/1935 | Christman | 74—412 X |

DAVID J. WILLIAMOWSKY, *Primary Examiner.*

DON A. WAITE, *Examiner.*

L. H. GERIN, *Assistant Examiner.*